2,942,641

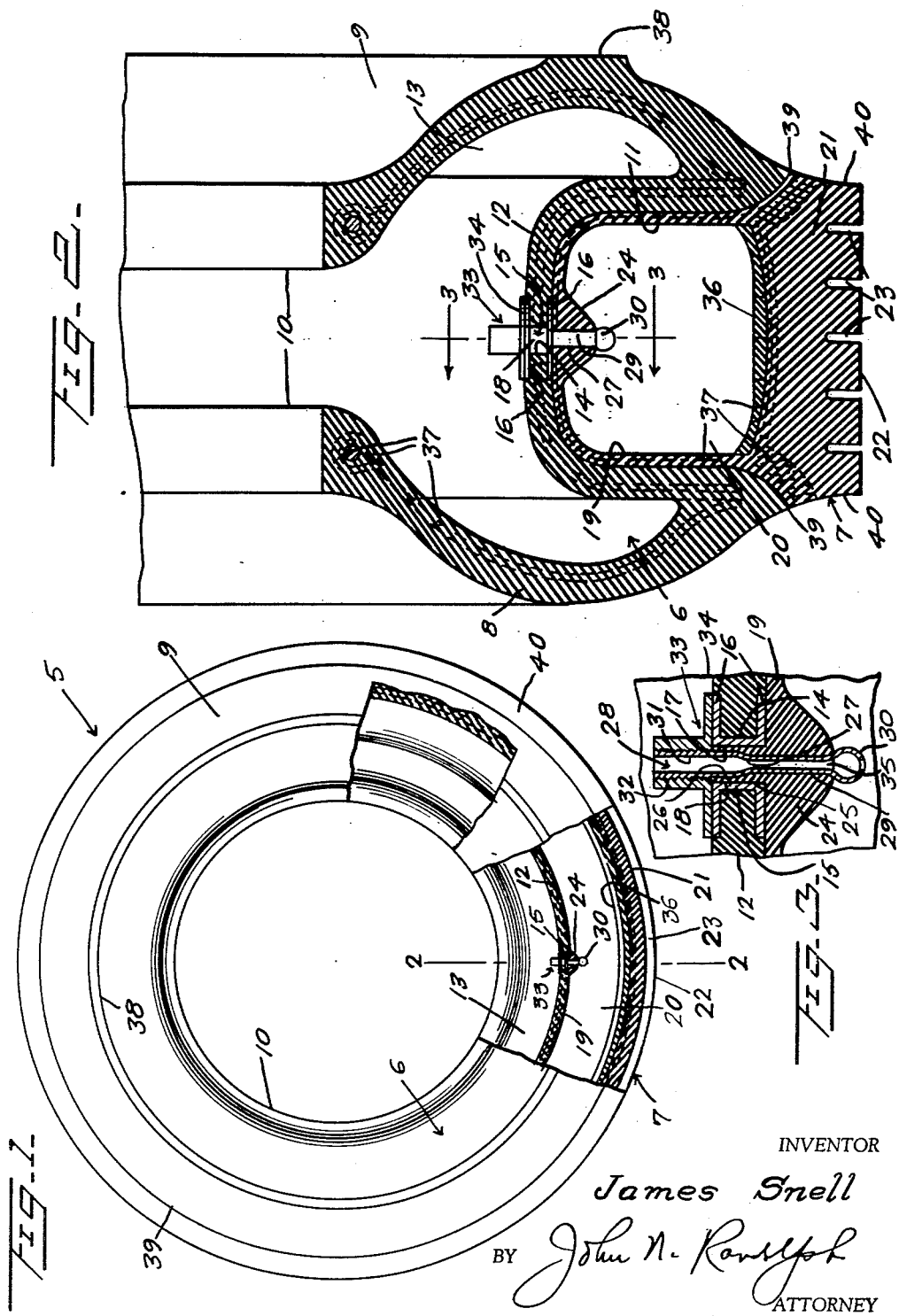

PNEUMATIC TIRE

James Snell, 1612 Butler St., Waycross, Ga.

Filed Dec. 15, 1958, Ser. No. 780,592

6 Claims. (Cl. 152—341)

This invention relates to a novel construction of pneumatic vehicle tire and more particularly to a tire formed of two annular interfitting sections which are detachably connected together, and including an outer section which is provided with the tread surface of the tire and which may be removed and replaced when the tread becomes worn.

Another object of the invention is to provide such a tire wherein the replaceable outer section of the tire is capable of being quickly attached to or detached from the inner body section of the tire so that said outer section can be replaced without the necessity of scraping, cutting, sanding, gluing or vulcanizing, as is normally required in retreading or recapping a pneumatic tire and which nearly always results in the retreaded or recapped tire being badly unbalanced.

Still a further object of the invention is to provide a pneumatic tire wherein the two tire sections form separate air chambers which cooperate to maintain the tire sections assembled when the air chambers are inflated, and wherein the air chamber of the replaceable outer section communicates by a restricted passage with the air chamber of the inner section to prevent rapid deflation of the tire due to puncturing of either air chamber.

Various other objects and advantages of the invention will hereinafter become more fully apparent from the following description of the drawing, illustrating a presently preferred embodiment thereof, and wherein:

Figure 1 is a side elevational view partly broken away of the pneumatic tire;

Figure 2 is an enlarged fragmentary radial sectional view, taken substantially along a plane as indicated by the line 2—2 of Figure 1, and Figure 3 is an enlarged fragmentary sectional view, taken substantially along a plane as indicated by the line 3—3 of Figure 2.

Referring more specifically to the drawing, the pneumatic tire in its entirety is designated generally 5 and includes an inner main body or casing section 6 and a replaceable outer tread section 7.

The inner or casing section 6 includes the usual side walls 8 and 9 having beaded inner edges 10, as is conventional. In lieu of the outer tread surface, as is conventional in a pneumatic tire, the inner casing section 6 is provided with a deep annular groove 11 formed in the periphery thereof. The inner part of the annular groove 11 is formed by an annular portion 12 of the casing section 6, which projects inwardly with respect to said casing section and into the outer part of the air chamber 13 thereof. Said inwardly extending casing portion 12 is provided with an opening 14 which is lined by a cylindrical portion 18 of a rigid grommet 15. The part of the annular portion 12, surrounding the opening 14, is clamped between the end flanges 16, to prevent expansion of said opening 14. The bore 17 of said cylindrical grommet portion 18, as seen in Figure 3, communicates with the groove 11 and the air chamber 13.

The outer tread section 7 comprises an annular tube 19 forming an annular air chamber 20. The tube 19, like the inner casing section 6, is formed of rubber, either natural or synthetic, and the outer portion of the tube 19 is substantially thickened to provide a tread portion 21, the outer surface 22 of which may be suitably grooved or cut to a considerable depth, as seen at 23, to provide traction means. The inner portion of the tube 19, at one point about the circumference thereof, is provided with an internally thickened wall portion 24 and an outwardly projecting nipple 25. The nipple 25 is disposed opposite the central part of the portion 24, as seen in Figure 3. The nipple 25 has a socket 26 opening outwardly of its distal end. A bore 27, of small cross sectional size, extends centrally through the wall portion 24 and into the nipple 25, and communicates with the inner end of the socket 26.

As seen in Figure 3, the nipple 25 is of a length to extend completely through the bore 17 of the grommet and is of a diameter to have a snug fitting engagement therein. An elongated rigid hollow tube 28 has a restricted shank portion 29 which extends through the bore 27 and by which said bore is held expanded, so that the shank portion has snug fitting engagement therein. The tube 28 has an enlarged rounded inner end forming a head 30 which is disposed beyond the inner end of the bore 27 to resist outward displacement of the shank 29 through said bore. The tube 28 has an enlarged outer end 31, an inner part of which is disposed in the socket 26. The tube end 31 is of a diameter to maintain said socket expanded. The outer end of the tube portion 31 projects from the inner side of the grommet 15 into the air chamber 13 and is externally threaded, as seen at 32. A nut 33 is threadedly connected to the tube portion 32 and has a flange 34 at its inner end which abuts against the grommet flange 16, which is disposed on the inner side of the wall portion 12, when said nut is tightened.

The tread section 7 is connected to or disconnected from the casing section 6 while the tire 5 is removed from a rim, not shown. After the nipple 25 has been forced inwardly through the grommet bore 17, the tube 28 is applied by forcing the head 30 through the socket 26 and then inwardly through the bore 27 for expanding said bore and socket and so that the compressed wall of the nipple 25, disposed between the tube 28 and grommet cylinder 18, will effectively seal the grommet bore 17. When the nut 33 is thereafter applied, as previously described, the bore 17 will be effectively sealed so that no air can escape therethrough around the nipple 25. As previously described, the grommet 15 effectively seals the opening 14 to prevent any passage of air between said opening and the grommet. With the tread section 7 thus applied and connected to the casing section 6, the tire 5 is mounted in a conventional manner. The casing section 6 constitutes a tubeless-type tire, the chamber 13 of which is inflated in a conventional manner after the tire is mounted on a rim. As the chamber 13 is inflated, a portion of the air escapes outwardly through a restricted passage, formed by the bore 35 of the tube 28, into the air chamber 20 of the tube 19. When the tire 5 is fully inflated, pressure in the chamber 20 will equal the pressure in the chamber 13, after a sufficient time has elapsed to permit balancing of the pressure by the passage of air through the bore 35.

The tire 5 thus forms a "lifeguard-type" tire in that it has two separate air chambers 13 and 20. Accordingly, if either chamber is punctured the tire will deflate slowly due to the fact that a part of the bore 35, extending through the shank 29, will effectively restrict escape of air through the tube 28 into the punctured air chamber. Thus, a vehicle equipped with the tire 5 will have ample time to stop after either air chamber of the tire has been punctured and before the tire 5 can become deflated sufficiently to adversely affect operation of the vehicle or to cause further damage to the tire.

Since the outer air chamber 20 is more susceptible to puncturing, since the tread portion 21 is disposed immediately around the outer side thereof, the outer portion of said air chamber 20 is preferably provided with a puncture-proof lining 36, which is secured against the inner surface of the tread portion 21.

The casing section 6 and also the tread section 7 are provided with reinforcing means 37 of a type which is conventional in connection with motor vehicle tires, as best seen in Figure 2. The wall 9 is preferably provided with an externally thickened ring portion 38 to form a curb guard, or both side walls 8 and 9 may be provided with such a curb guard, so that either side wall may provide the outer wall of the tire 5.

The peripheral edges 39 of the casing section 6 are feathered, as seen in Figure 2, so that the exposed side edges 40 of the tread portion 21 form smooth uninterrupted continuations of the curvature of the outer surfaces of the side walls 8 and 9. Thus, the assembled tire 5 will appear to be of one piece construction. The edges 39 of the side walls 8 and 9 are spaced inwardly sufficiently from the tread surface 22 so that said side wall edges 39 will not be subjected to any wear.

It will be apparent that when the tire 5 is inflated that the inflated chambers 13 and 20 will materially assist in maintaining the outer tread section 7 in close fitting engagement in the casing section 6.

When the tread section 7 has become worn, the tire 5 is removed from its rim and the nut 33 and tube 28 are then removed, after which the tread section 7 can be removed from the casing section 6 and replaced with a new tread section 7. It will also be apparent that the new tread section 7 will not adversely affect the balance of the tire 5.

The cross sectional shape of the tire 5, as illustrated in Figure 2, may vary considerably, depending upon the type of vehicle on which the tire is to be employed; however, the structure of the tire 5, as previously described, will not be affected by such changes in shape of the tire portions.

Various modifications and changes are contemplated and may be resorted to, without departing from the function or scope of the invention as hereinafter defined by the appended claims.

I claim as my invention:

1. A pneumatic tire comprising a tubeless-type inner casing section having an annular air chamber, said casing section having a peripheral portion spaced outwardly from said air chamber and provided with a deep annular groove opening outwardly thereof, said casing section having an annular wall portion extending inwardly of said air chamber forming the bed of said groove, said wall portion having a bore opening into the air chamber and groove; an outer tread section comprising an annular tube fitting snugly in said groove and defining a second air chamber, said tube having a stem projecting through said bore into the first mentioned air chamber, means for sealing said bore around said stem, said stem having a restricted bore extending therethrough forming a restricted communicating passage between the air chambers, the peripheral portion of said tube being thickened to provide a tread portion of substantial radial thickness extending outwardly from said groove and having an outer annular tread surface of substantial width and spaced radially outward from the outermost peripheral portion of the casing section, said wall portion of the casing section having an opening, a grommet lining said opening and having a bore forming the bore of said wall portion, said stem including a nipple forming an integral projection of said tube, said nipple fitting detachably in the grommet bore, said tube having a restricted bore opening into the interior thereof and into said hollow nipple, and a rigid tube, forming a part of the stem, detachably mounted in and extending through said nipple and tube bore, said rigid tube having an externally threaded end extending into the first mentioned air chamber, and a nut threadedly engaging said tube end and bearing against said grommet and combining with the rigid tube and grommet to form said means for sealing said bore around the stem.

2. A pneumatic tire comprising a tubeless-type inner casing section having an annular air chamber, said casing section having a peripheral portion spaced outwardly from said air chamber and provided with a deep annular groove opening outwardly thereof, said casing section having an annular wall portion extending inwardly of said air chamber forming the bed of said groove, said wall portion having a bore opening into the air chamber and groove; an outer tread section comprising an annular tube fitting snugly in said groove and defining a second air chamber, said tube having a stem projecting through said bore into the first mentioned air chamber, means for sealing said bore around said stem, said stem having a restricted bore extending therethrough forming a restricted communicating passage between the air chambers, the peripheral portion of said tube being thickened to provide a tread portion of substantial radial thickness extending outwardly from said groove and having an outer annular tread surface of substantial width and spaced radially outward from the outermost peripheral portion of the casing section, a part of said stem being formed integral with said tube and including a nipple projecting outwardly from the tube and fitting in said wall portion bore, said tube having a restricted bore opening into said second air chamber and outwardly of the distal end of the nipple, and a rigid tube detachably mounted in and extending through said bore of the annular tube, said rigid tube being of a size to expand the bore of the annular tube for compressing the nipple between a part of the rigid tube and the bore of the wall portion for sealing said wall portion bore, whereby said rigid tube and nipple form said bore sealing means.

3. A pneumatic tire as in claim 2, said rigid tube having a threaded end projecting into said first air chamber and beyond the nipple and grommet, a nut threadedly engaging said threaded tube end and bearing against the inner side of said wall portion.

4. A pneumatic tire comprising an inner casing section and an outer tread section, said casing section having an annular air chamber and a deep annular groove opening outwardly of the periphery of the casing section, said casing section having an annular wall portion separating said air chamber and groove, said wall portion being inwardly bowed in cross section and protruding into the air chamber, said tread section including an annular tread portion of substantial width and thickness projecting outwardly from said groove and an annular tube formed integral with said tread portion and snugly fitting the inner portion of said groove and defining a second air chamber, and means extending through said wall portion and forming a sealed joint between the first mentioned air chamber and groove and a restricted air passage between said air chambers, said wall portion having a grommet provided with a bore connecting the first mentioned air chamber and groove, said means comprising a nipple forming a part of the tube and fitting said grommet bore, a passage formed in the tube and opening into the air chamber and outwardly of the distal end of said nipple, and a rigid tube detachably mounted in said passage for expanding the nipple in the grommet bore to provide said sealed joint between the first mentioned air chamber and groove, said rigid tube having a bore forming said restricted air passage.

5. A pneumatic tire as in claim 4, said rigid tube having an enlarged inner end disposed internally of the annular tube and resisting removal of said rigid tube from the annular tube, said rigid tube having a threaded end extending from the nipple and grommet into the first mentioned air chamber, a nut threadedly engaging said threaded tube end and bearing against the grommet to detachably secure the tread section to the casing section.

6. A pneumatic tire comprising an inner casing section and an outer tread section, said casing section having an annular air chamber and a deep annular groove opening outwardly of the periphery of the casing section, said casing section having an annular wall portion separating said air chamber and groove, said wall portion being inwardly bowed in cross section and protruding into the air chamber, said tread section including an annular tread portion of substantial width and thickness projecting outwardly from said groove and an annular tube formed integral with said tread portion and snugly fitting the inner portion of said groove and defining a second air chamber, and means extending through said wall portion and forming a sealed joint between the first mentioned air chamber and groove and a restricted air passage between said air chambers, said inner casing section having annular transversely spaced peripheral portions disposed outwardly of the annular tube and between which an inner part of the tread portion is confined.

References Cited in the file of this patent

UNITED STATES PATENTS

| 508,621 | Kirk et al. | Nov. 14, 1893 |
| 2,152,131 | Benson et al. | Mar. 28, 1939 |

FOREIGN PATENTS

| 107,718 | Austria | Oct. 25, 1927 |
| 1,155,291 | France | Nov. 25, 1957 |